Patented May 7, 1935

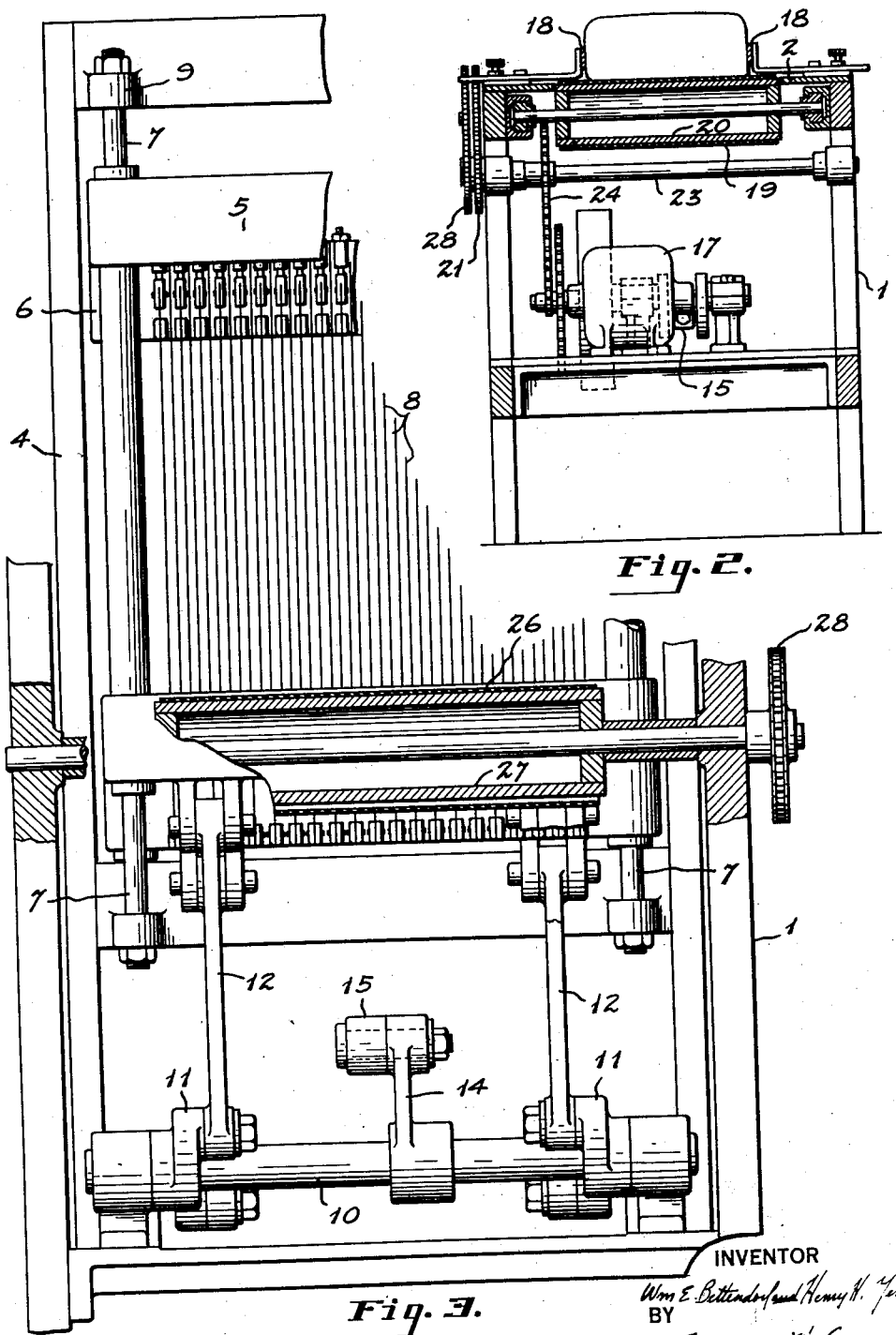

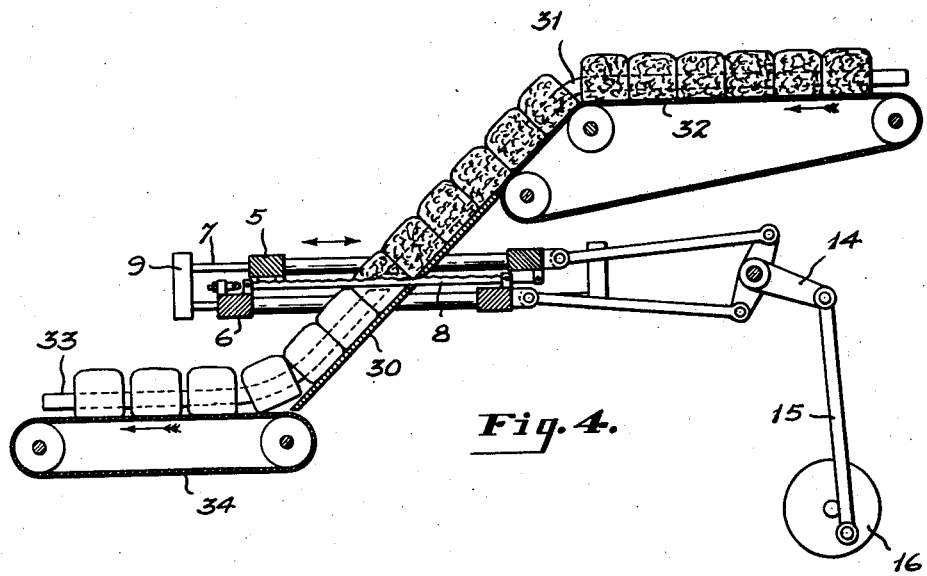
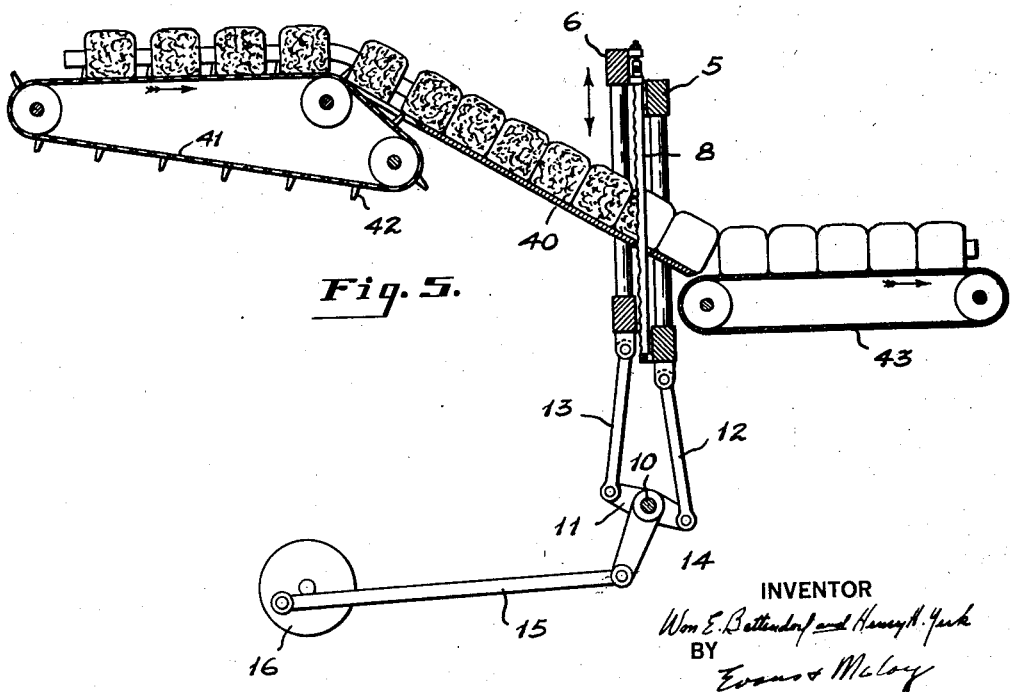

2,000,816

UNITED STATES PATENT OFFICE 2,000,816

BREAD SLICING MACHINE

William E. Bettendorf and Henry H. Yerk, Bettendorf, Iowa, assignors, by mesne assignments, to The Micro Corporation, Bettendorf, Iowa, a corporation of Delaware Application November 7, 1931, Serial No. 573,532

6 Claims. (Cl. 146—153)

This invention relates to the art of slicing bread and more particularly to the apparatus for and method of slicing bread on a commercial basis.

In baking institutions where bread is commercially sliced, the bread is always sliced when it is fresh. Slicing bread under such condition, with the conventional slicing methods and apparatus, has a tendency toward crushing and breaking the loaf texture.

This crushing effect is occasioned by the fact that in most cases the loaves of bread are positively and continuously moved through the slicing blades with considerable pressure, even though the blades may not be doing any actual cutting. This is particularly true in the case where cutters of the reciprocating type are employed. The cutter blades momentarily come to rest at the ends of their strokes, and the crushing tendency of the bread occurs during this period of rest, since the feeding mechanism such as endless conveyors, mechanical pushers and the like, is feeding the loaves at the same rate during the entire slicing operation. The bread may not in all cases actually crush but this crushing tendency has a disastrous effect in causing uneven slicing,—that is, the slicing cuts may be uneven or of wave-like form.

It is therefore one of the objects of the present invention to provide new and improved means for the commercial slicing of bread wherein the tendency toward crushing of the loaves is substantially eliminated.

Another object is to provide a method of slicing bread wherein the loaves of bread are cushioned in such a manner that the same will not be crushed during the slicing operation.

Another object is to provide a bread slicing machine of the reciprocating type with means for feeding the unsliced loaves of bread to the cutting blades in such a manner that several loaves may act as a cushioning means for each loaf being sliced in order that the loaf being sliced will not be crushed when the cutting blades are momentarily at rest at the ends of their reciprocations.

With the above and other objects in view, which will be apparent from the following detailed description, the invention consists in certain features of construction and combinations of parts which will be apparent to those skilled in the art.

In the drawings, which illustrate suitable embodiments of the present invention, Figure 1 is a side elevation of one form of slicing machine wherein the cutter blades are arranged at an angle to the feed table, portions of the side frame being broken away to show the operating mechanism;

Fig. 2 is a transverse section taken substantially on the line 2—2 of Fig. 1;

Fig. 3 is an enlarged section taken substantially on the line 3—3 of Fig. 1, showing the arrangement of cutting blades and operating mechanism;

Fig. 4 is a diagrammatic view of another type of slicing machine in which the present invention is incorporated, the cutting blades being shown in a horizontal position; and Fig. 5 is a further modified form of slicing machine in which the cutting blades and feed table are arranged at an angle to each other in order that the blades may first sever a corner of the loaf being sliced.

Figure 1:
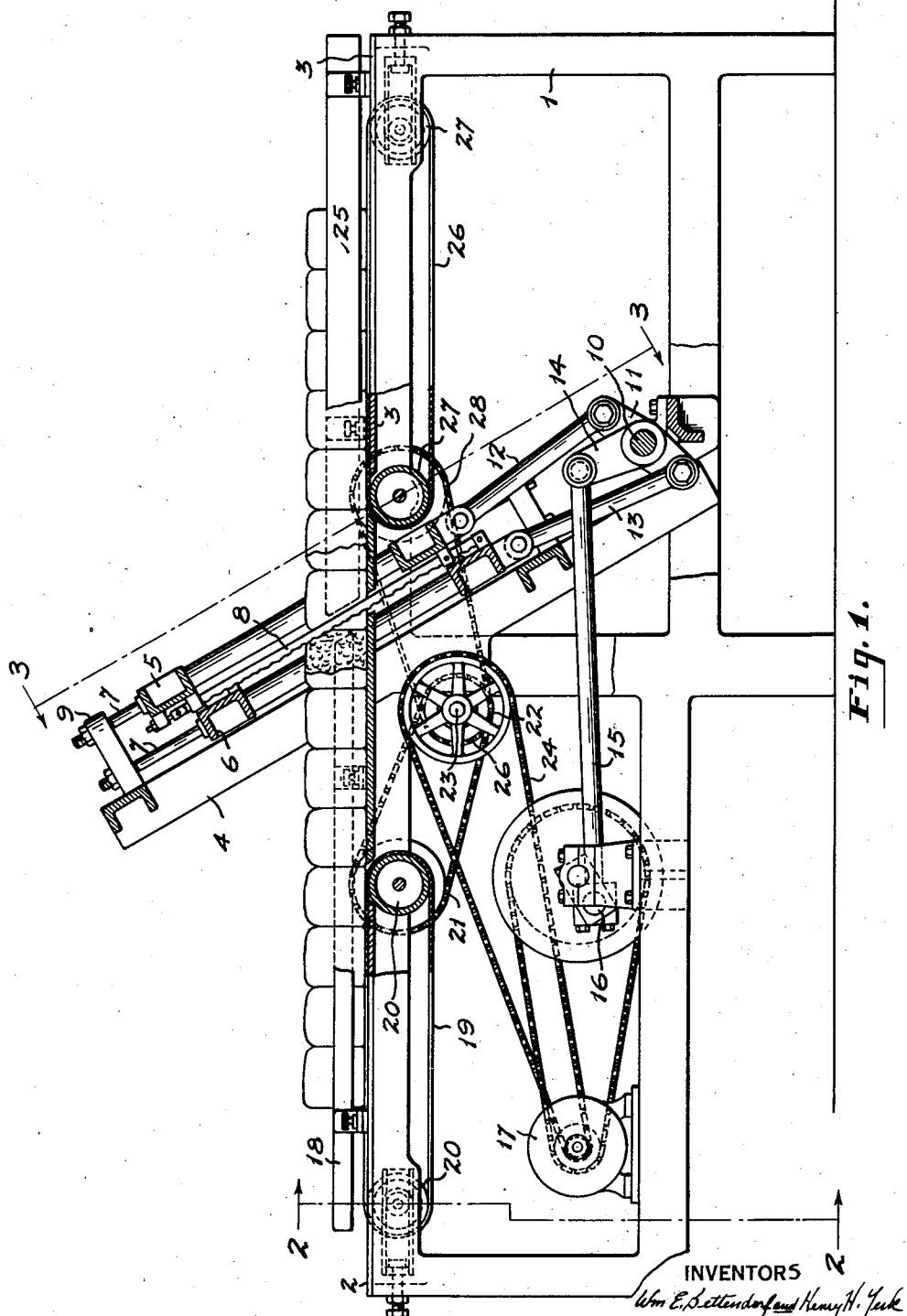

Referring to the accompanying drawings, in which like numerals refer to like parts throughout the several views, the slicing mechanism illustrated in Figs. 1, 2 and 3 is carried by suitable side frames 1 having a horizontal feed table 2 at one end and a horizontally arranged discharge table 3 at the opposite end.

The slicing mechanism is of the reciprocating type and is carried by suitable extensions 4 secured to the side frames 1. The slicing mechanism consists of a pair of alternately reciprocable blade frames 5 and 6 which are mounted upon spaced guide members 7 to reciprocate at an angle to the feed table 2. Each blade frame is provided with a plurality of uniformly spaced cutter blades 8 which lie between the cutter blades of the other blade frame in order that all the blades will simultaneously engage a corner of the loaf to be sliced at the beginning of the slicing operation. The guide members 7 are rigidly secured to suitable brackets 9 that are carried by the side frames 1 and side frame extensions 4.

The blade frames are alternately reciprocated in opposite directions by means of a walking beam comprising a shaft 10 mounted horizontally of the side frames and having a pair of double-ended levers 11 secured thereto. One end of each lever is connected by means of a connecting rod 12 to the blade frame 5, and the opposite end of each lever is connected by means of a connecting rod 13 to the blade frame 6. An oscillating motion is imparted to the shaft 10 by means of an arm 14 which is pivoted to a connecting rod 15 that is carried by a suitable crank 16. The crank 16 is driven by a suitable motor 17 and when in operation causes the blade frames, through the mechanism described, to alternately reciprocate.

The loaves of bread to be sliced are fed to the cutter blades 8 on the horizontal feed table 2 between spaced adjustable side guides 18 that are mounted on the feed table and which are adjustable to bread loaves of different lengths.

The loaves of unsliced bread are positively fed between the side guides 18 toward the cutter blades 8 by an endless apron 19. The apron 19 is mounted upon a pair of spaced rollers 20 which are so arranged that the upper side of the apron passes over the feed table 2, as shown in Fig. 1. The apron is driven by a suitable link chain 21 or other driving means from a sprocket 22 that is mounted on a central conveyor drive shaft 23, the drive shaft 23 being driven from the motor 17 by a chain 24 or any other suitable mechanism.

The inner apron roller 20 is spaced somewhat rearwardly of the cutting blades 8 so that a plurality of loaves (here shown as four) are positioned on the feed table 2 between the cutter blades 8 and the inner end of the feeding apron 19. This arrangement is provided to prevent a crushing of the loaves as they are being sliced. This crushing, as previously described, occurred in heretofore known constructions, during the period each cutter blade was at the end of its stroke. In other words, each blade momentarily comes to rest and during this time the feeding mechanism, whether it be a conveyor or other pushing mechanism, is feeding the loaf at the same rate as when the cutter blade is actually cutting the loaf. In the construction shown in Fig. 1, the pressure created by the driving mechanism when the blades are at rest is distributed over a plurality of loaves, and since these loaves are resilient, they will flex a sufficient amount without crushing to overcome the crushing action when the slicing blades are at rest at the ends of their strokes and feeding pressure is exerted against the same. In previously known constructions, the loaf being sliced was positively fed by some mechanism such as that previously described.

Each loaf, as it is sliced, passes between spaced side guides 25 mounted on the discharge table 3, these side guides 25 being arranged to slightly compress the sliced loaf in an endwise direction in order to prevent a disarrangement of the slices. The loaves are carried away from the slicing blades by means of a suitable endless apron 26 which is mounted on a pair of drive rollers 27 to extend over a portion of the discharge table 3. This discharge apron 26 is driven by means of a suitable link chain 28 or other mechanism from the main driving shaft 23. It is preferable to have the discharge apron 26 travel at a slightly faster rate than the feeding apron in order that the sliced loaves will be rapidly carried away from the slicing blades. It is also preferable to have the slicing blades and the feed apron arranged at an angle less than 90 degrees in order that the blades may first sever a corner of the loaf being sliced. This severing of the loaf at a single corner greatly assists in the slicing operation and also tends toward the prevention of crushing the loaves being sliced.

In the construction shown in Fig. 4 the general construction of the slicing mechanism is identical with that shown in Fig. 1 and is numbered in the same manner as the mechanism shown in Fig. 1. The blade frames 5 and 6 and the attached cutter blades 8 in this case are arranged in a horizontal position and the loaves of bread are fed to the blades in a downward direction.

Specifically, a feed chute 30 is arranged at an angle to the cutter blades so that in this construction the blades first sever a lower corner of each loaf.

The loaves of bread are fed to the blades between spaced side guides 31 on an endless conveyor 32 having a horizontal portion and an inclined portion arranged at the same angle as the feed chute 30, the conveyor being mounted on three suitable rollers. The bread, as it is fed through the cutting blades 8 passes between suitable discharge guides 33 and is conducted away from the chute 30 by means of a horizontally arranged discharge conveyor 34. In this construction the loaves are fed by gravity to the cutter blades 8 and also by means of the inclined portion of the conveyor 32 which creates sufficient friction on the loaves to impart an additional feeding action thereto. The function of the device shown in Fig. 4, however, is identical with that previously described, in that the conveyor 32 terminates a sufficient distance from the cutting blades that a plurality of loaves may be arranged on the said chute to absorb the pressure that is created when the slicing blades are at the ends of their stroke and momentarily at rest.

The general construction of the slicing mechanism shown in Fig. 5 is the same as that previously described, and the various parts carry the same numbers. In this construction, however, the cutting blades 8 are arranged in a vertical position and a feed table 40 is arranged at an angle to the cutting blades 8 in order that the blades may first sever a corner of the loaves. The loaves of bread in this case are partially fed by gravity to the slicing blades 8 and are further positively fed by positive feed conveyor 41, the feed conveyor having a plurality of flights 42 thereon which move the bread in a horizontal position to the feed table 40, and each flight is arranged to engage each loaf during a portion of its travel down the inclined feed table 40, as shown in Fig. 5. The last contact, however, of the flight with the loaf which it feeds occurs at a point remote from the slicing blades, in order that a plurality of loaves may be disposed at all times on the feed table 40 in advance of the cutter blades 8 to absorb the pressure that is created when the blades are momentarily at rest at the ends of their stroke.

The feed table 40 extends preferably beyond the cutter blades to discharge the sliced loaves of bread onto a suitable endless conveyor 43.

It will be noted, in each of the constructions described, that the feed tables and cutter blades are so arranged that the blades first sever one or the other of the forward corners of the loaf being sliced, and furthermore, that the positive feeding means and the cutter blades are so positioned that a plurality of loaves are disposed between the same. This is a very important feature, as previously described, in that such constructions substantially eliminate the tendency of the loaves to crush or break their texture during the slicing operation. The plurality of loaves having no direct contact with the positive feeding means, absorb the additional pressure that is created when the cutter blades are momentarily at rest, the pressure being distributed over the several loaves.

In each of the constructions shown, the discharge conveyors are so arranged that they may discharge the sliced loaves of bread onto the feeding means of a suitable bread wrapping machine or, if desired, the discharge conveyors may comprise the feeding conveyor of a wrapping machine.

Three different arrangements of the cutter blades, the feed tables and feeding conveyors are illustrated in the drawings, and it is to be understood that other combinations may be employed in combination with the present invention without departing from the scope of the appended claims.

What we claim is:

1. In a bread slicing machine, a plurality of reciprocable slicing blades, a feed table for conducting unsliced bread to said blades, said feed table being inclined with respect to said cutter blades whereby unsliced loaves of bread may move by gravity to said blades, said feeding means and slicing blades being disposed a material distance apart whereby a plurality of loaves of bread may be positioned on said table between said blades and feeding means to absorb the pressure created by said feeding means when said blades are momentarily at rest at the ends of their reciprocations, said feeding means comprising an endless conveyor having an inclined portion extending in the same direction as said feed table for moving unsliced loaves of bread to said feed table.

2. In a bread slicing machine, a plurality of reciprocable slicing blades, a feed table for conducting unsliced bread to said blades, said feed table being inclined with respect to said cutter blades whereby unsliced loaves of bread may move by gravity to said blades, said feeding means and slicing blades being disposed a material distance apart whereby a plurality of loaves of bread may be positioned on said table between said blades and feeding means to absorb the pressure created by said feeding means when said blades are momentarily at rest at the ends of their reciprocations, said feeding means comprising an endless conveyor having a horizontal feeding portion and an inclined feeding portion for frictionally engaging unsliced loaves of bread and feeding the same to said inclined feed table.

3. In a bread slicing machine, a plurality of reciprocable slicing blades, a feed table for conducting unsliced bread to said blades, said feed table being inclined with respect to said cutter blades whereby unsliced loaves of bread may move by gravity to said blades, said feeding means and slicing blades being disposed a material distance apart whereby a plurality of loaves of bread may be positioned on said table between said blades and feeding means to absorb the pressure created by said feeding means when said blades are momentarily at rest at the ends of their reciprocations, said feeding means comprising an endless conveyor having an inclined portion and flights thereon arranged to engage each loaf during a portion of its travel on said feed table to impart a positive feeding pressure thereto.

4. A continuous method of commercially slicing bread, which consists in continuously feeding a plurality of loaves at an acute angle to the cutting means while maintaining a positive pressure against one of said plurality of loaves remote from the cutting means, and maintaining a plurality of loaves between the source of pressure and the loaf being sliced, whereby the loaves interposed between the source of positive pressure and the loaf being sliced may flex and absorb excessive pressures and exert a substantially uniform pressure on the loaf being sliced.

5. In a bread slicing machine, a plurality of reciprocable slicing cutters, a table extending upwardly and rearwardly at an acute angle from the cutting edges of said cutters for supporting unsliced loaves of bread, and a power feed endless conveying means associated with said table for continuously feeding the unsliced loaves toward the cutting edges of said cutters, said conveying means terminating a distance sufficiently rearwardly of said cutting edges to provide a space on said table for the reception of a plurality of unsliced loaves between said conveying means and said cutting edges whereby the pressure created by said conveying means and tending to move one loaf through said cutters is cushioned by a plurality of loaves between said cutting edges and conveying means and whereby the plurality of loaves absorbs the pressure when said cutters are momentarily at rest at the ends of their reciprocations.

6. In a bread slicing machine, a plurality of reciprocable slicing cutters, a feeding table inclined relative to said slicing cutters for supporting a plurality of loaves in side abutting relation, and an endless conveying means terminating a distance from said cutters sufficiently great to dispose a plurality of loaves of bread on said table in advance of said cutters and having flights engageable with unsliced loaves of bread for feeding the same to said feed table and for exerting continuous and positive feeding pressure on the plurality of loaves carried by said table whereby the plurality of loaves carried by said table between said cutters and conveying means may absorb the pressure created by said conveying means when said cutters are momentarily at rest.

WILLIAM E. BETTENDORF.
HENRY H. YERK.